(12) United States Patent
Drechsel et al.

(10) Patent No.: US 12,546,095 B2
(45) Date of Patent: Feb. 10, 2026

(54) WASTE-WATER DIVERTER

(71) Applicant: Revincus GmbH, Weimar (DE)

(72) Inventors: Felix Konstantin Drechsel, Weimar (DE); Ben Schaefer, Ilmenau (DE)

(73) Assignee: Revincus GmbH, Weimar (DE)

( * ) Notice: Subject to any disclaimer, the term of this patent is extended or adjusted under 35 U.S.C. 154(b) by 23 days.

(21) Appl. No.: 18/715,778

(22) PCT Filed: Dec. 7, 2022

(86) PCT No.: PCT/EP2022/084748
§ 371 (c)(1),
(2) Date: Jun. 3, 2024

(87) PCT Pub. No.: WO2023/104862
PCT Pub. Date: Jun. 15, 2023

(65) Prior Publication Data
US 2025/0171984 A1    May 29, 2025

(30) Foreign Application Priority Data
Dec. 10, 2021    (DE) ...................... 10 2021 214 110.2

(51) Int. Cl.
*F16K 11/052* (2006.01)
*E03B 1/04* (2006.01)
*E03C 1/00* (2006.01)

(52) U.S. Cl.
CPC ............ *E03B 1/044* (2013.01); *F16K 11/052* (2013.01); *E03C 2001/005* (2013.01)

(58) Field of Classification Search
CPC . E03B 1/044; E03C 1/00; E03C 1/182; E03C 2001/005; F16K 11/052
See application file for complete search history.

(56) References Cited

U.S. PATENT DOCUMENTS 11,466,785 B2 * 10/2022 Bato ...................... F16K 11/052
2013/0048087 A1    2/2013 Sato

FOREIGN PATENT DOCUMENTS

| AU | 2009100438 A4 | 6/2009 |
|---|---|---|
| CA | 2592294 A1 | 11/2008 |

(Continued)

OTHER PUBLICATIONS

European Patent Office, International Search Report and Written Opinion in Application No. PCT/EP2022/084748, dated Mar. 6, 2023, 10 pages, Rijswijk, Netherlands.

*Primary Examiner* — Hailey K. Do
(74) *Attorney, Agent, or Firm* — Marshall & Melhorn, LLC (57) ABSTRACT

A waste water diverter may have a housing, which encloses a cavity, a waste water inlet arranged at an upper end of the housing and opening into the cavity. The diverter may also have a grey water outlet and a black water outlet, which are connected to the cavity, and arranged at a lower end of the housing. A guide plate may be arranged in the cavity to be pivotable about an axis of rotation between a first position and a second position via a drive such that waste water flowing in through the waste water inlet is guided by the guide plate in the first position into the grey water outlet and the black water outlet is blocked, and in the second position the grey water outlet is blocked by the guide plate and the waste water is guided into the black water outlet.

14 Claims, 13 Drawing Sheets

(56) References Cited

FOREIGN PATENT DOCUMENTS

DE            10118648  A1     12/2002
WO    WO-2013076229  A1  *   5/2013   ................ E03F 5/00
WO         2016170247  A1     10/2016

* cited by examiner

WASTE-WATER DIVERTER

FIELD

The invention relates to a waste water diverter.

BACKGROUND

WO 2020/148230 A1 describes a device and a method for heat recovery from grey water with a heat exchanger, whereby a coarse filter is provided for the grey water in order to prevent or reduce fouling of the heat exchanger.

The object of the invention is to provide a waste water diverter.

According to the invention the object is achieved by a waste water diverter according to the appended claims.

Advantageous embodiments of the invention are the subject of the subclaims.

SUMMARY

A waste water diverter according to the invention comprises a housing which encloses a cavity, wherein a waste water inlet is arranged at an upper end of the housing, which opens into the cavity, wherein a grey water outlet and a black water outlet are arranged at a lower end of the housing, which are connected to the cavity, wherein a guide plate is arranged in the cavity so as to be pivotable by means of a drive between a first position and a second position about an axis of rotation in such a way that waste water flowing in through the waste water inlet is guided by the guide plate in the first position into the grey water outlet and the black water outlet is blocked and in the second position the grey water outlet is blocked by the guide plate and the waste water is guided into the black water outlet. The axis of rotation can be defined by a rotating shaft, which can be rotated by the drive. For example, the rotating shaft is attached to one edge of the guide plate.

In one embodiment, the guide plate in the first position abuts against a first stop of an inner surface of the housing on the side of the black water outlet, wherein this inner surface may in particular have a step such that the inner surface projects towards the cavity above the first stop in the position of use.

In one embodiment, a screen is pivoted to an edge of the guide plate remote from the axis of rotation, which in the first position is located in the waste water flow between the waste water inlet and the grey water outlet and in the second position is not located in the waste water flow. In this way, grey water can be filtered while black water is passed through without being filtered. The filtered grey water can then be used for other purposes.

In one embodiment, an edge of the screen remote from the guide plate is attached to one end of at least one tension spring, the other end of which is attached to or near the wall of the housing. In this way, the screen can be guided or guidance can be supported, in particular when swivelling into the second position. In one embodiment, the edges of the guide plate, which face the sides of the housing in which the pivot axis or pivot shaft is mounted, are shaped or edged in such a way that the outflowing water is directed into the grey water outlet when the guide plate is in the first position.

In one embodiment, the screen is moved into a pocket of the cavity in the second position.

In one embodiment, a backwash nozzle is arranged in the wall of the housing, which is directed towards an underside of the screen, which is inclined in the second position with a gradient in the direction of the black water outlet. In this way, the screen, which is inclined in the second position, can be rinsed from its underside, in particular with clear rinsing water. Filter cake that has been backwashed out of the screen flows together with the rinsing water along the screen to the black water outlet.

In one embodiment, a flexible lip is also arranged which, as a result of the movement of the screen during swivelling from the first position to the second position, brushes along the top of the screen towards the guide plate and thus wipes filter cake from the surface of the screen towards the black water outlet.

In one embodiment, the lip is positioned in such a way that when the second position is reached, a gap is created between the lip and the screen so that the lip does not obstruct the flow of rinsing water during backwashing by means of the backwash nozzle.

In one embodiment, a guide for the edge of the screen remote from the guide plate is arranged in the housing in such a way that the edge of the screen remote from the guide plate is guided upwards towards the end of the swivelling movement towards the second position in order to create the gap.

According to one aspect of the present invention, a waste water system is provided, comprising at least one waste water diverter as described above, wherein a sensor system is arranged upstream of the waste water diverter, which is configured to signal if the waste water flowing through or expected next is black water, wherein a control system connected to this sensor system and to the drive of the waste water diverter is arranged, which is configured to control the drive in such a way that the guide plate is swivelled into the second position when black water is signalled. The sensor system can, for example, include a switch or sensor that directly or indirectly detects the actuation of a flush button of a toilet flush and thus signals black water. In this case, a wireless or wired controller connected to this sensor system and connected to the drive of the wastewater diverter can control the drive in such a way that the guide plate is swivelled into the second position. A power supply for the sensor system can, for example, be provided by a generator that is driven by a water wheel in an inlet pipe of the toilet flush, in particular upstream of the flush button, for example in the inlet pipe of a cistern. In one possible embodiment, this generator can itself be part of the sensor system and indirectly detect the actuation of the flush button based on the resulting flow in the inlet pipe.

In one embodiment, the control unit is further configured to swivel the guide plate to the first position by default.

In one embodiment, a bypass is arranged to divert wastewater from the wastewater inlet to the blackwater outlet in the event of backwater in the wastewater diverter.

In one embodiment, the grey water outlet is connected to a device for heat recovery, which is configured to heat drinking water and/or heating water of a hot water heating system in a heat exchanger using waste heat from the grey water.

DESCRIPTION OF THE FIGURES

Examples of embodiments of the invention are explained in more detail below with reference to drawings.

DETAILED DESCRIPTION

Corresponding parts are labelled with the same reference symbols in all figures.

FIGS. 1 to 12 show schematic views of a waste water diverter 1.

Figure 13:
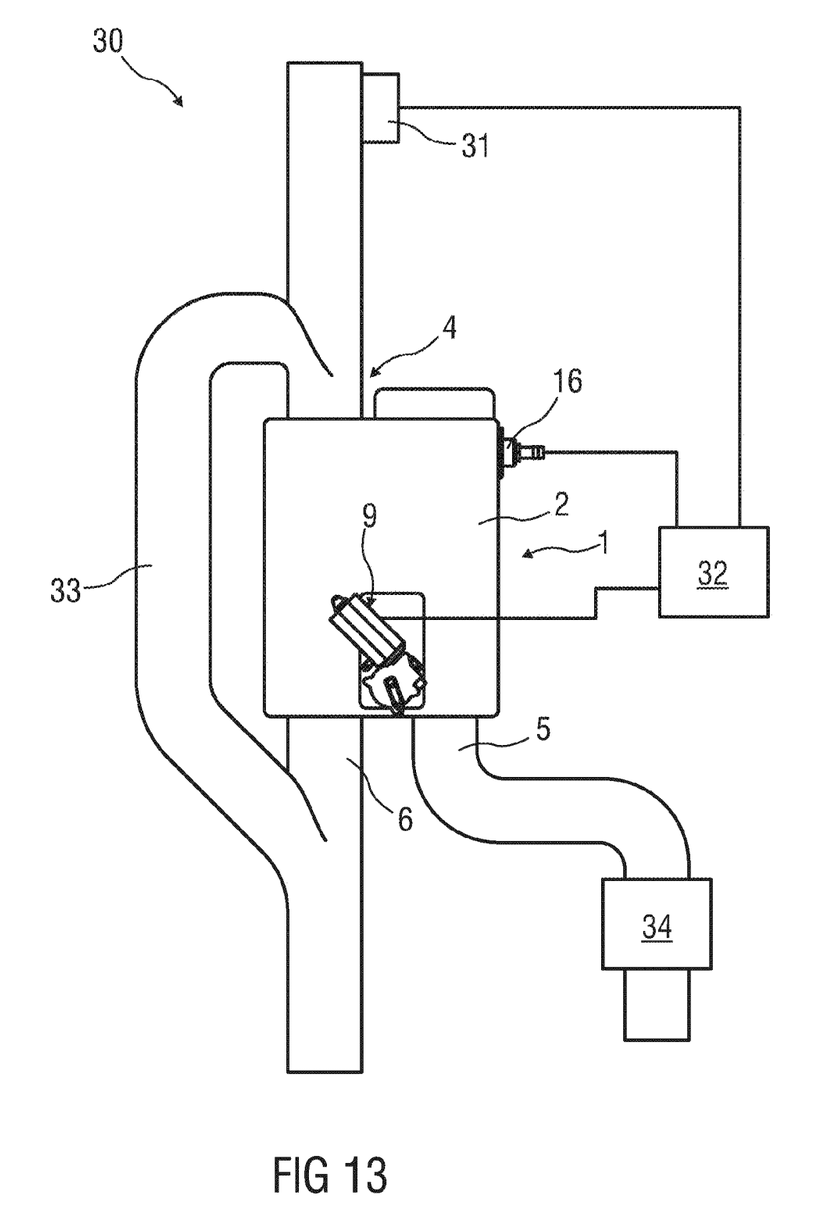
FIG. 13 is a schematic view of a wastewater system with the wastewater diverter valve.

In FIGS. 1, 2, 4 to 7, 10 and 12, the wastewater diverter 1 is shown in a position of use in which it is typically intended to be installed in a wastewater system 30 (shown in FIG. 13). Positional and directional designations used in the context of the present invention, such as above and below, refer to this position of use, unless otherwise indicated.

The wastewater diverter 1 comprises a housing 2 that encloses a cavity 3. A waste water inlet 4 is arranged at an upper end of the housing 2, which opens into the cavity 3 and can, for example, be designed as a sleeve into which one end of a waste water pipe can be inserted. A grey water outlet 5 and a black water outlet 6 are arranged at a lower end of the housing 2, which are connected to the cavity 3 and can, for example, each be designed as nipples that can be inserted into the respective sleeves of waste water pipes.

Figure 1:
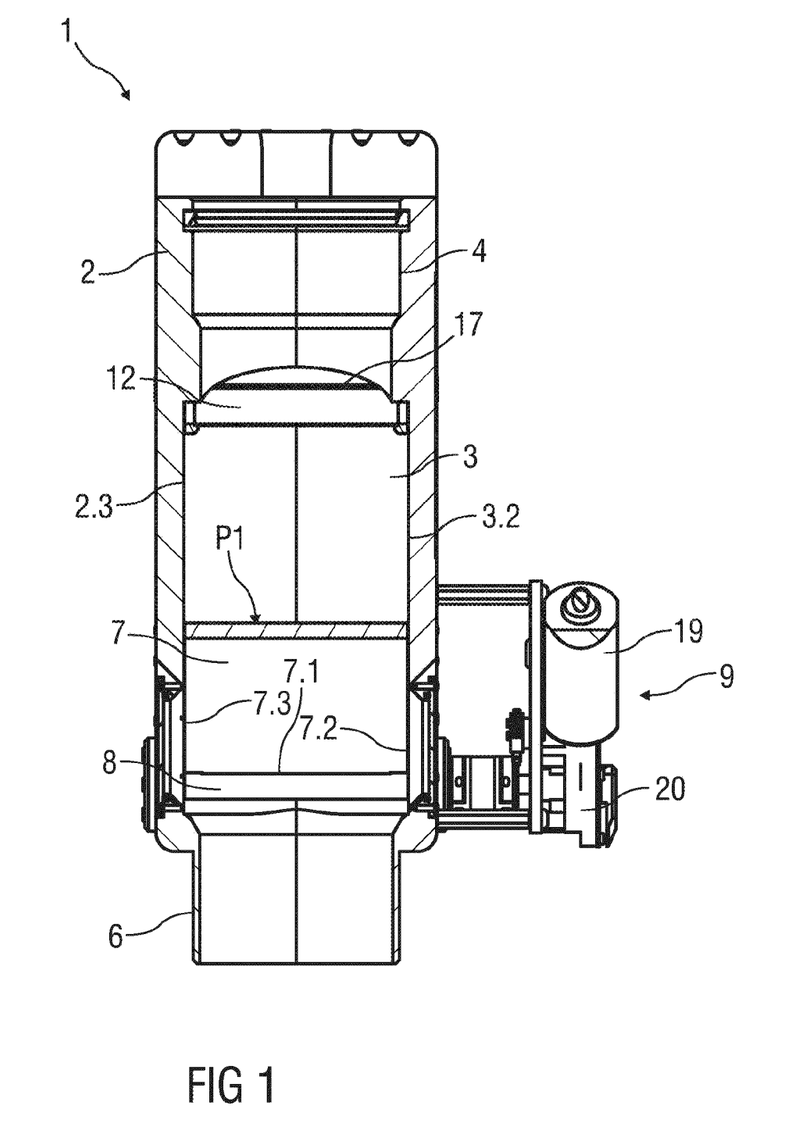
FIG. 1 is a schematic sectional view of a waste water diverter in a position of use.
Figure 2:
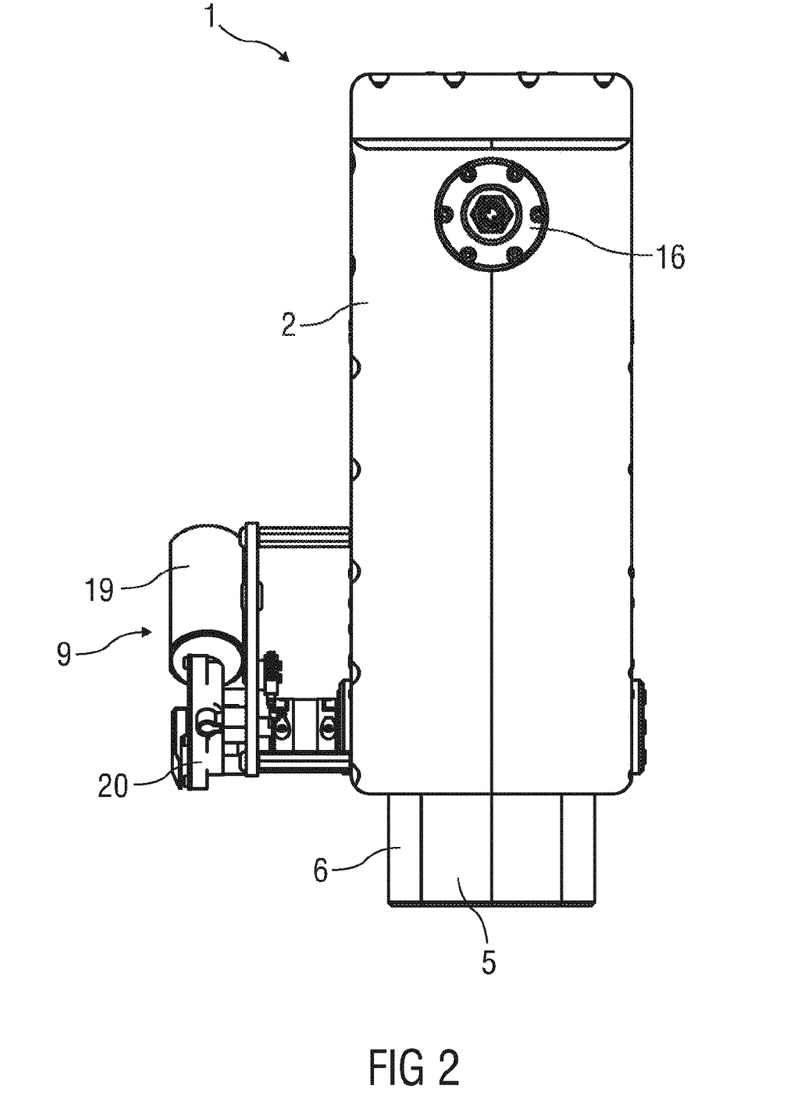
FIG. 2 is a schematic side view of the waste water diverter in the position of use.
Figure 3:
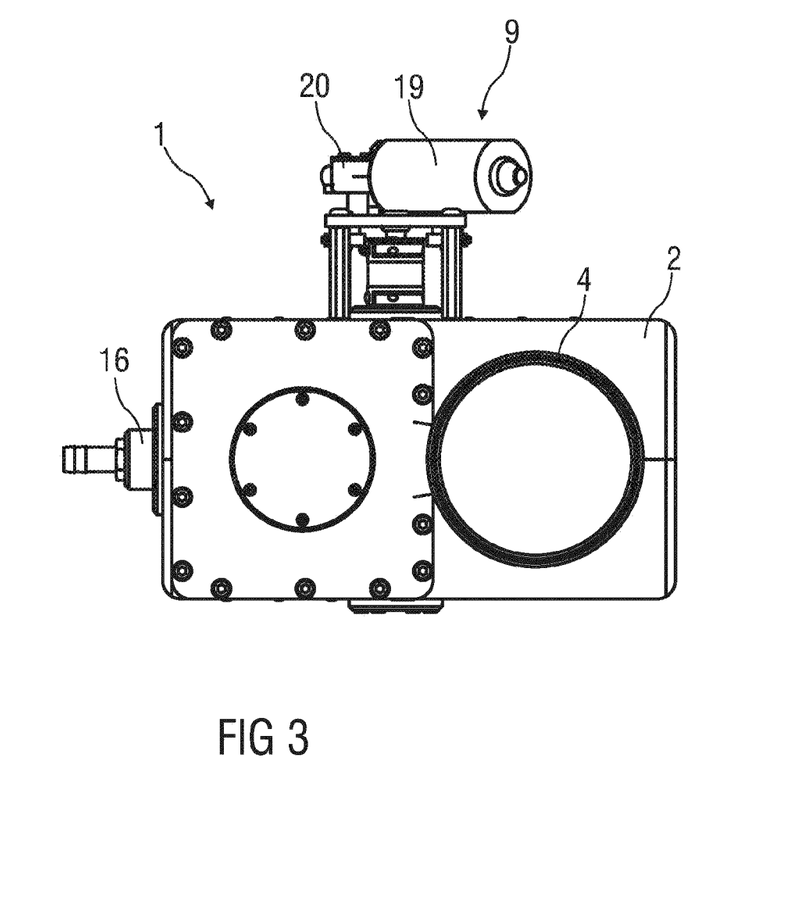
FIG. 3 is a schematic view of the waste water diverter from above.
Figure 4:
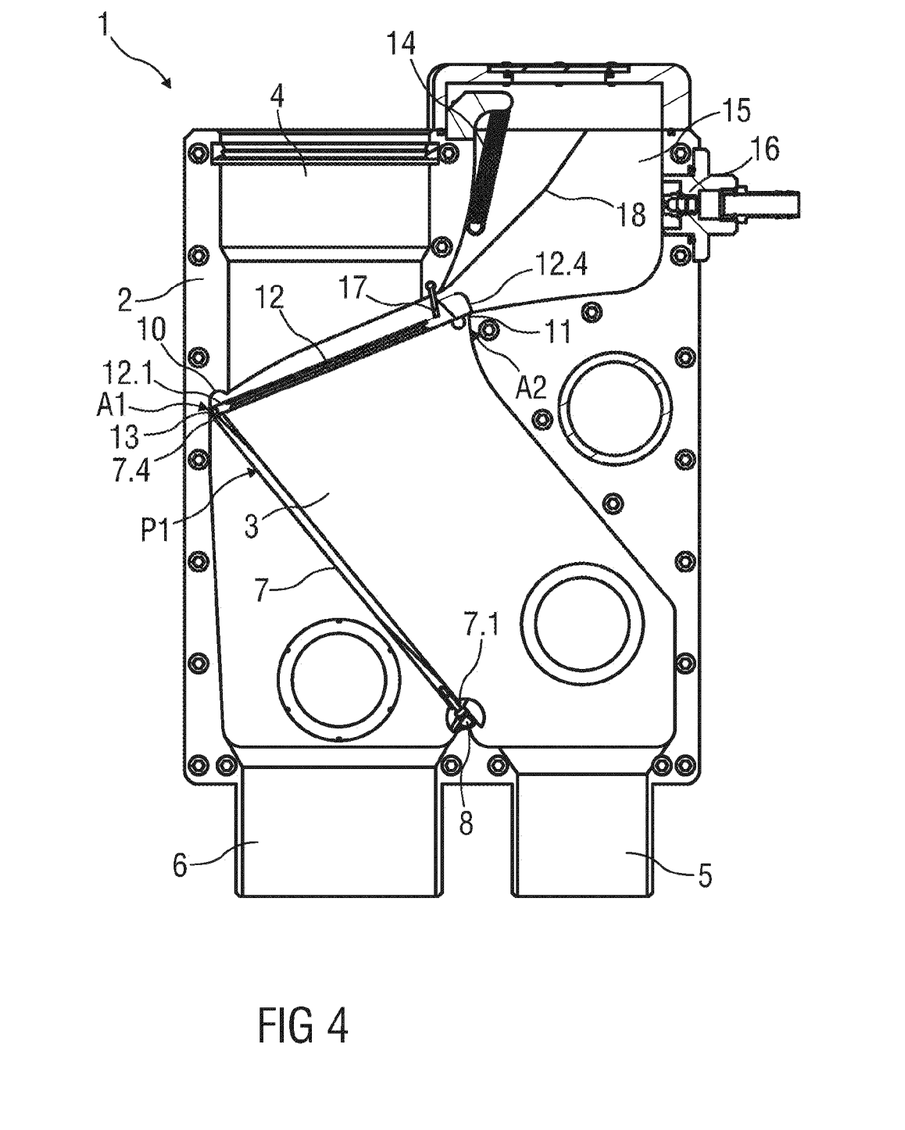
FIG. 4 is a schematic sectional view of the waste water diverter in the position of use with a guide plate in a first position.
Figure 5:
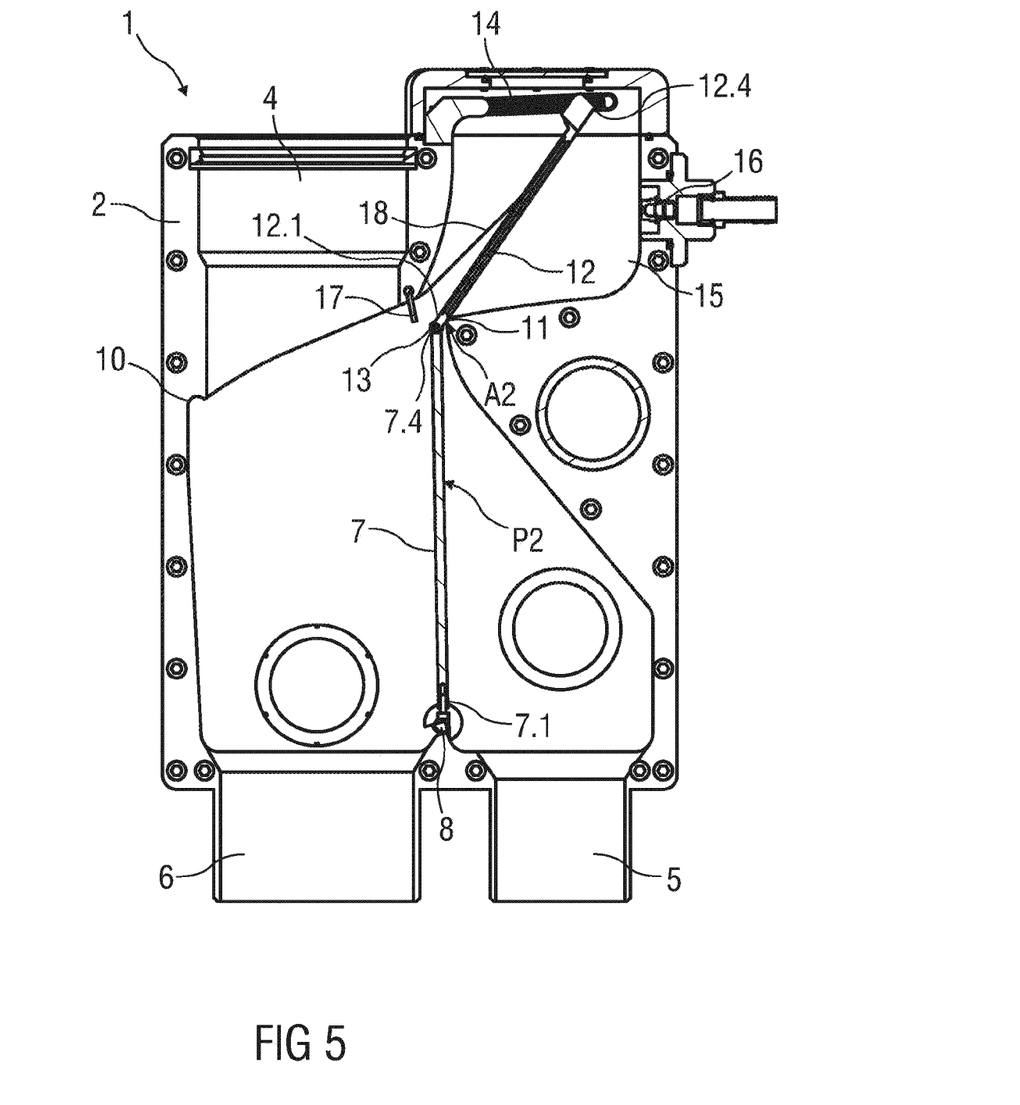
FIG. 5 is a schematic sectional view of the waste water diverter in the position of use with a guide plate in a second position.
Figure 6:
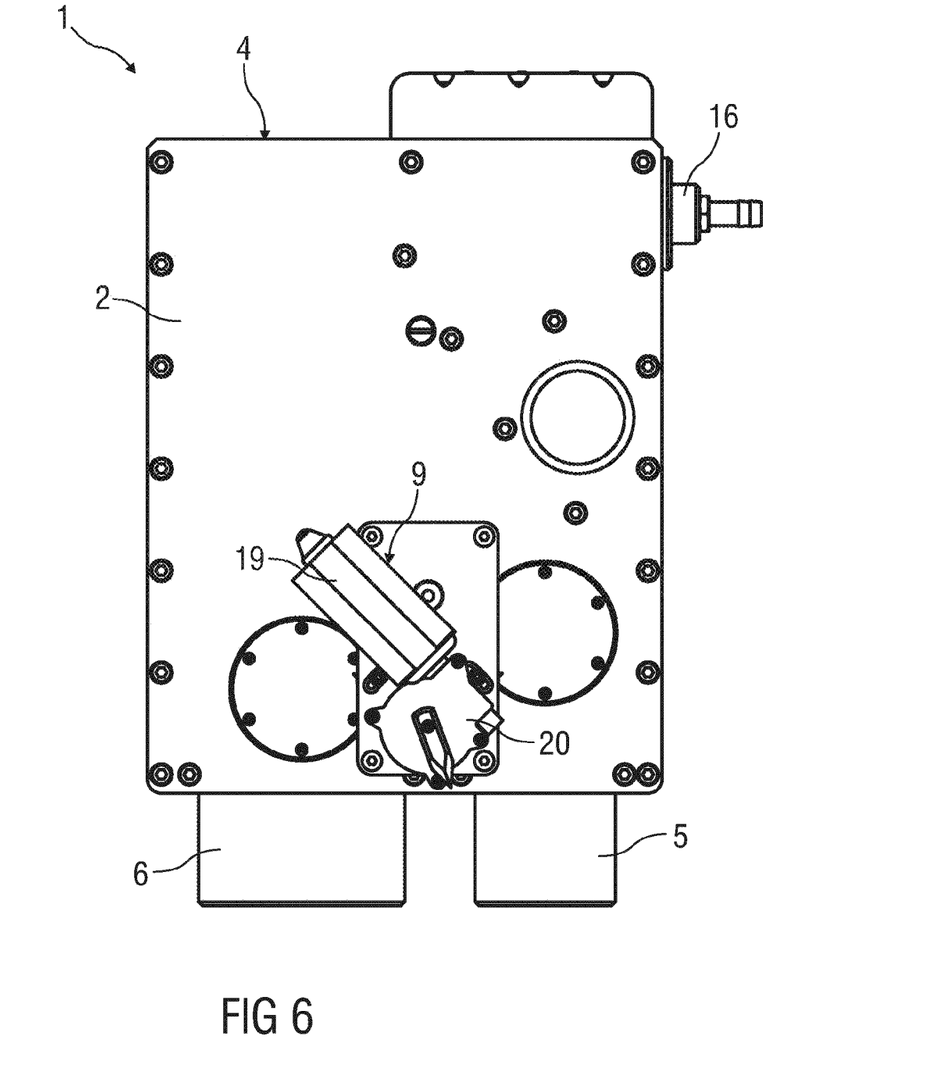
FIG. 6 is another schematic side view of the wastewater diverter in the position of use.
Figure 7:
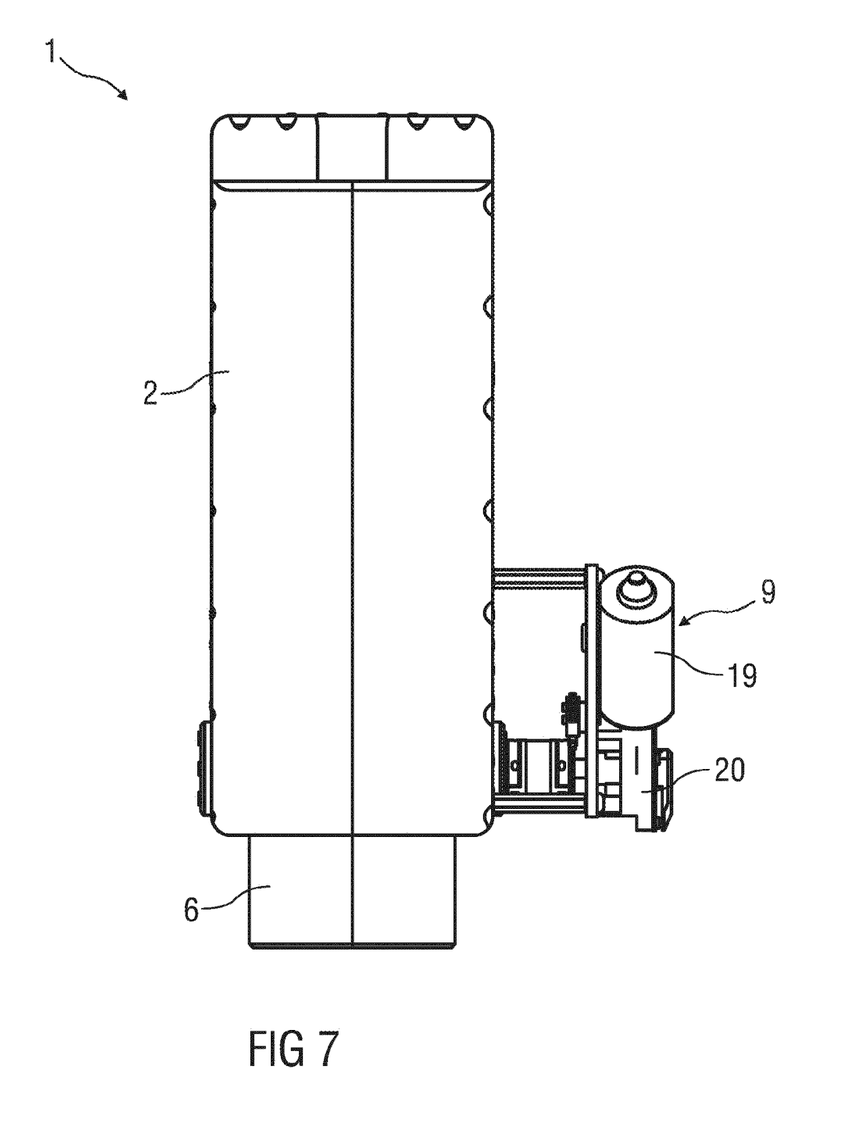
FIG. 7 is another schematic side view of the wastewater diverter in the position of use.
Figure 8:
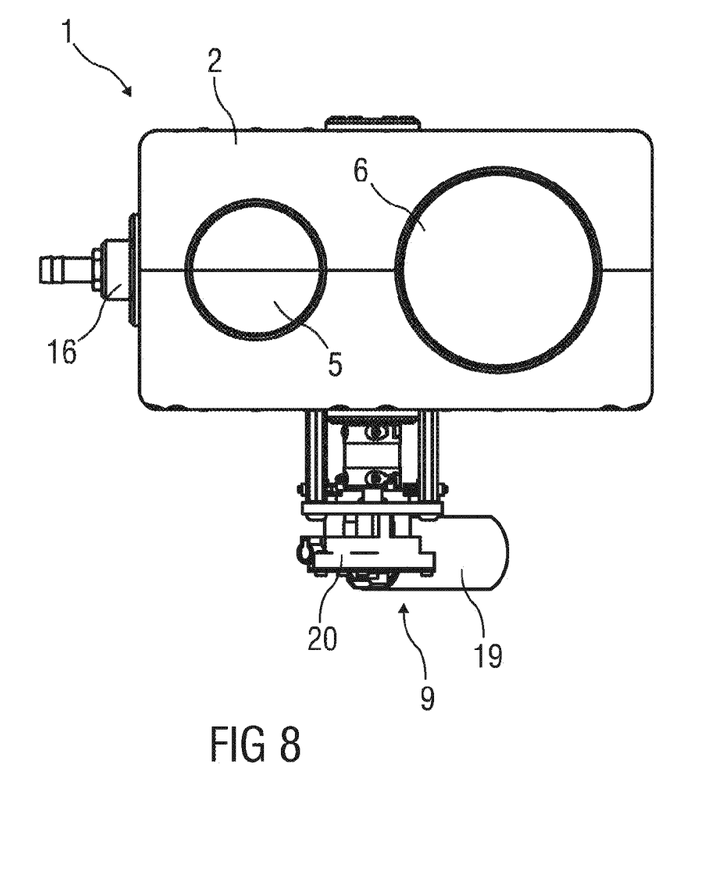
FIG. 8 is a schematic view of the waste water diverter from below.
Figure 9:
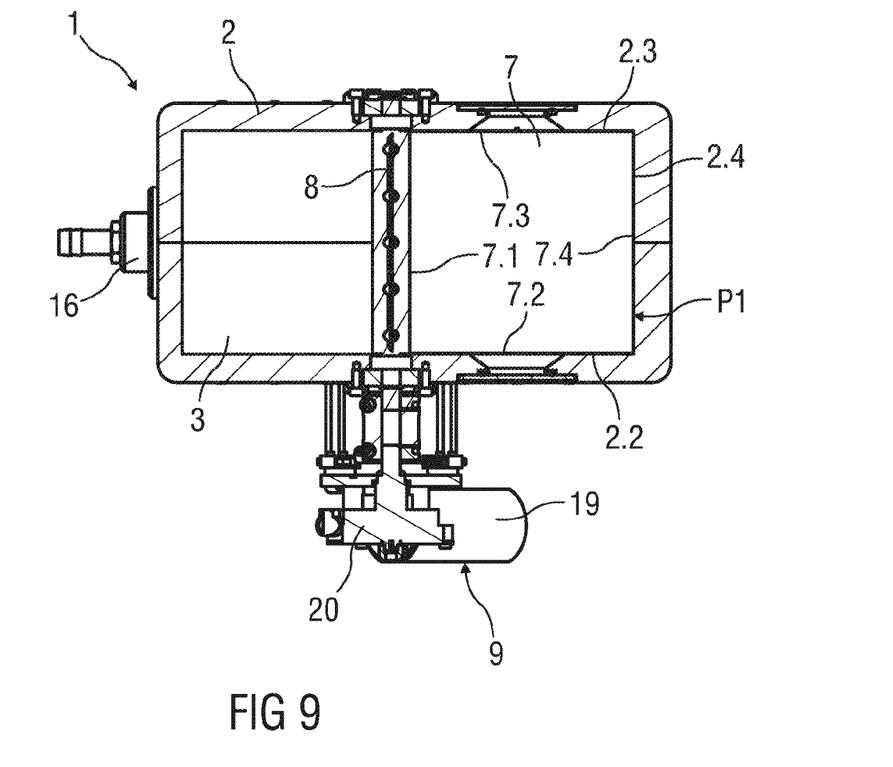
FIG. 9 is another schematic sectional view of the waste water diverter.
Figure 10:
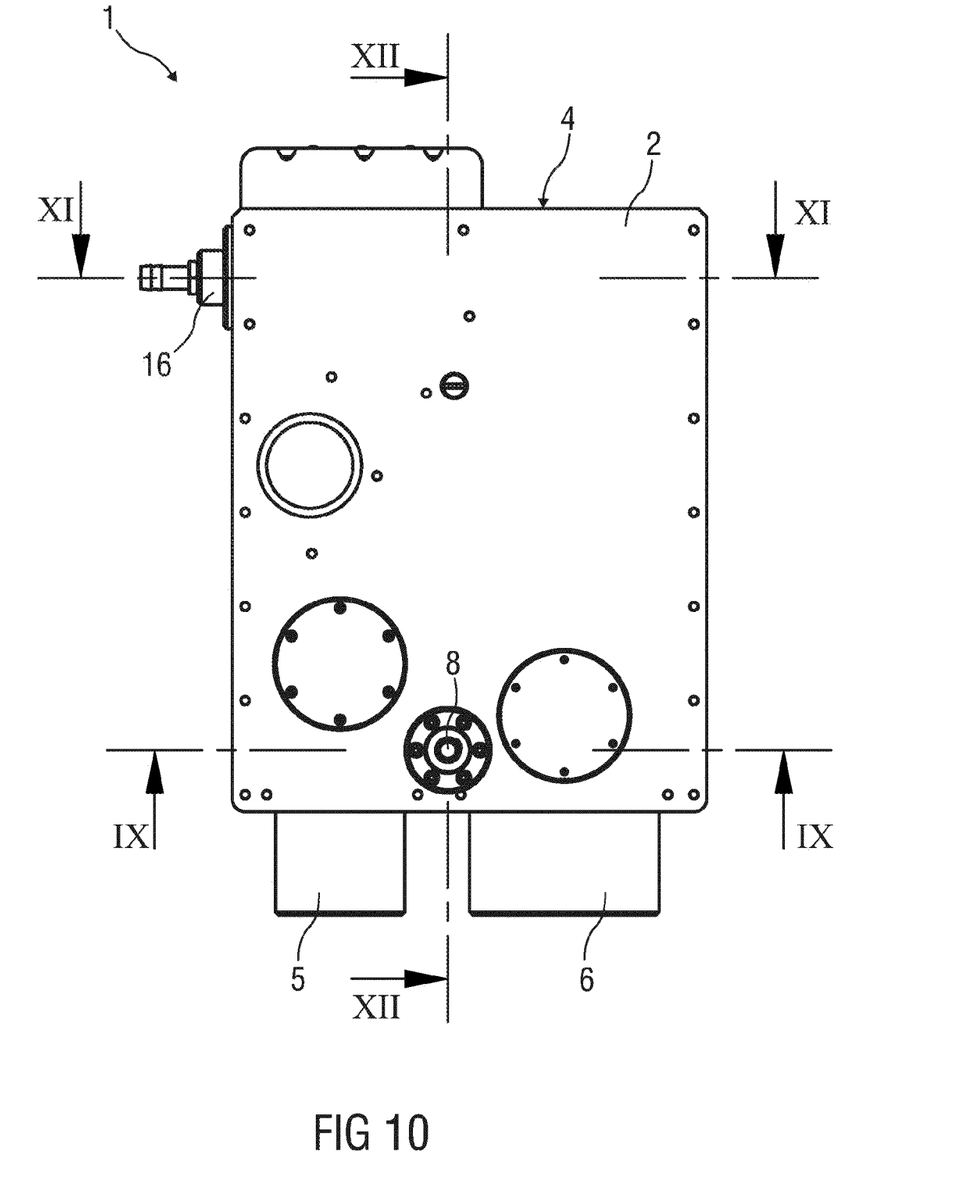
FIG. 10 is another schematic side view of the wastewater diverter in the position of use.
Figure 11:
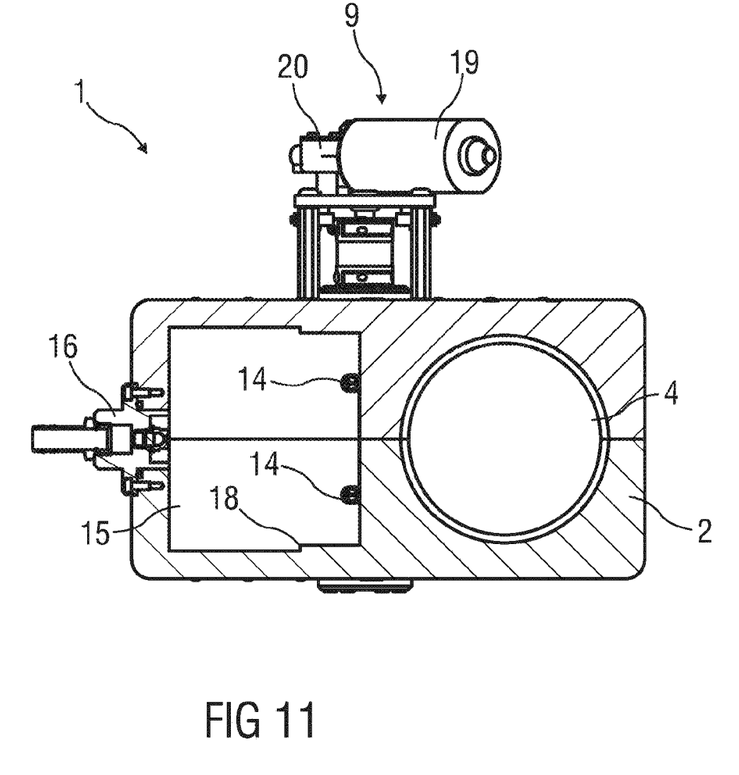
FIG. 11 is another schematic sectional view of the waste water diverter.
Figure 12:
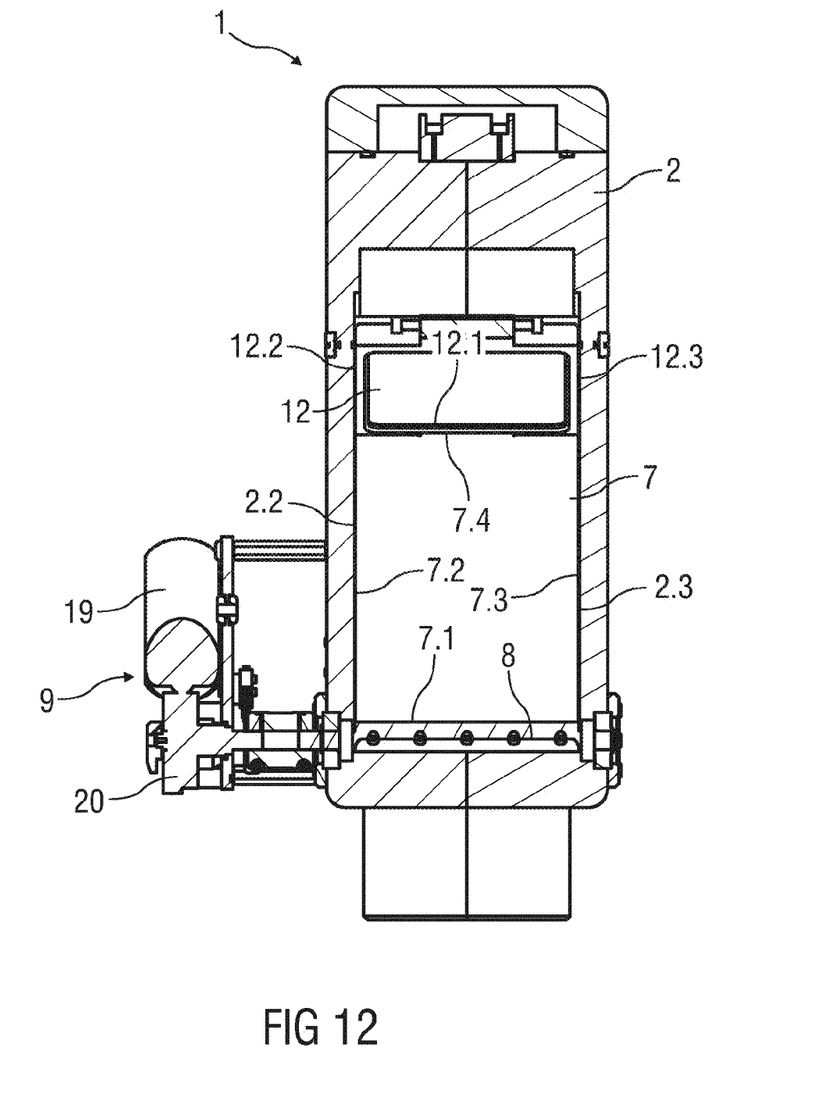
FIG. 12 is another schematic sectional view of the wastewater diverter in the position of use.

A guide plate 7 is arranged in the cavity 3, which can be pivoted between a first position P1, as shown in FIG. 4, and a second position P2, as shown in FIG. 5, in such a way that waste water flowing in through the waste water inlet 4 is directed into the grey water outlet 5 in the first position P1 and into the black water outlet 6 in the second position P2.

The guide plate 7 is attached, for example, to a rotating shaft 8, which is arranged in a lower area of the cavity 3 between the grey water outlet 5 and the black water outlet 6 and is rotatably mounted in the housing 2. The rotating shaft 8 is connected to a drive 9, which may, for example, have a motor 19, in particular an electric motor, and optionally a gearbox 20, for example a worm gear. In particular, the drive 9 can be arranged outside the housing 2. In this case, the rotating shaft 8 is guided out of the housing 2. In other embodiments, the drive 9 can have a pneumatic cylinder.

At least over a swivelling range of the guide plate 7 between the first position P1 and the second position P2, two opposing inner surfaces 2.2, 2.3 of the housing 2, which are swept by opposing edges 7.2, 7.3 of the guide plate 7, each have a contour which is complementary to a contour of the respective edge 7.2, 7.3 of the guide plate 7. For example, the guide plate 7 can be rectangular, whereby a first edge 7.1 of the rectangle is attached to the rotating shaft 8 and a second edge 7.2 adjacent to the first edge 7.1 and a third edge 7.3 of the rectangle adjacent to the first edge 7.1 each sweep over an inner surface 2.2, 2.3 of the housing 2 when swivelling. The edges 7.2, 7.3 do not have to touch the inner surfaces 2.2, 2.3, but can be guided at a distance in order to prevent jamming. The inner surfaces 2.2, 2.3 are parallel to each other at least in the swivelling range. For example, the housing 2 can be essentially cuboid in shape for this purpose.

In the embodiment shown, the black water outlet 6 is located essentially vertically below the waste water inlet 4, while the grey water outlet 5 is located to the side of the black water outlet 6. In the first position P1, the guide plate 7 therefore runs diagonally through the cavity 3 and rests with a fourth edge 7.4, which is opposite the first edge 7.1, against a first stop A1 of an inner surface 2.4 of the housing 2 on the side of the black water outlet 6 or is at least located in the vicinity of this inner surface 2.4. This inner surface 2.4 can have a step 10 such that the inner surface 2.4 protrudes above the first stop A1 towards the cavity 3. The step 10 can have a slight undercut. The step 10 prevents the waste water from hitting the area between the screen 12 and the inner surface 2.4, so that it runs at least predominantly through the screen 12. The step 10 can also extend to the inner surfaces 2.2 and 2.3. The step 10 does not necessarily have to be aligned horizontally, but can run in any direction, for example at an angle. In one embodiment, the edges of the guide plate 7 facing the inner surfaces 2.2 and 2.3 of the housing 2, in which the axis of rotation or rotating shaft 8 is mounted, are shaped or folded in such a way that the water flowing off is directed into the grey water outlet 5 when the guide plate 7 is in the first position P1. This also causes the waste water to run at least predominantly through the screen 12.

In the second position P2, the guide plate 7 can, for example, be positioned vertically or approximately vertically at a second stop A2 in the housing 2 or in the vicinity of such a second stop A2. However, it could also be provided that the second stop A2 is arranged in the housing 2 at such a position that the guide plate 7 is swivelled beyond a vertical position in the second position P2. In particular, it may be provided that the second stop A2 is arranged on a projection 11 of the housing 2 projecting into the cavity 3.

A screen 12 is pivotably attached to the fourth edge 7.4 of the guide plate 7, whereby a swivelling axis 13, about which the screen 12 is pivotable, runs parallel to the fourth edge 7.4 of the guide plate 7. The screen 12 can also be rectangular in shape and is attached to the swivelling axis 13, for example, by a first edge 12.1. A second edge 12.2 adjacent to the first edge 12.1 sweeps over the inner surface 2.2 during swivelling, and a third edge 12.3 of the screen 12 adjacent to the first edge 12.1 sweeps over the inner surface 2.3 of the housing 2 during swivelling. The edges 12.2, 12.3 do not have to touch the inner surfaces 2.2, 2.3, but can be guided at a distance in order to prevent jamming.

A fourth edge 12.4 opposite the first edge 12.1 is attached to one end of at least one tension spring 14, the other end of which is attached to or near the wall of the housing 2, for example to or near an upper wall in a pocket 15 of the cavity 3 laterally next to the waste water inlet 4. A length of the screen 12 between the first edge 12.1 and the opposite fourth edge 12.4 can be dimensioned such that the fourth edge 12.4 rests against the projection 11 in the region of the second stop A2 or is at least in the vicinity of the projection 11 when the guide plate 7 is in the first position P1.

In the first position P1, the cavity 3 is thus divided by the screen 12 into a part located above the screen 12 and a part located below the screen 12, so that wastewater flowing in through the wastewater inlet 4 must pass through the screen 12, with filtered-out solids remaining on the screen 12. The guide plate 7 divides the part below the screen 12 again so that the filtered wastewater flows along the slope of the guide plate 7 to the grey water outlet 5, while access to the black water outlet 6 is blocked by the guide plate 7.

In the second position P2, the screen 12 is located in the pocket 15 and thus not in the inflow from the wastewater inlet 4. The guide plate 7 or the screen 12 in the area of its first edge 12.1 is in contact with the second stop A2 or is at least in the vicinity of the second stop A2, so that the guide plate 7 blocks access to the greywater outlet 5 and wastewater from the wastewater inlet 4 flows unfiltered into the blackwater outlet 6.

In one embodiment, a backwash nozzle 16 can be provided, in particular in the outer wall furthest away from the waste water inlet 4 and directed into the pocket 15, so that the screen 12, which is inclined in the second position P2 in the pocket 15, can be rinsed from its underside, in particular with clear rinsing water. Filter cake backwashed from the screen 12 flows together with the rinsing water along the screen 12 to the black water outlet 6. The backwashing can be triggered, for example, at a predetermined time interval or volume-controlled after a certain flow rate. A volumetric flow meter can be provided for this purpose.

Between the pocket 15 and the waste water inlet 4, a flexible lip 17 can be provided above the screen 12 extending from the inner surface 2.2 towards the inner surface 2.3, which lip 17 is directed towards the screen 12 and, as a result of the movement of the screen 12 during the swivelling from the first position P1 to the second position P2, brushes along the top of the screen 12 and thus wipes filter cake from the surface of the screen 12 towards the black water outlet 6. The lip 17 is in such a position that a gap is created between the lip 17 and the screen 12 when the second position P2 is reached, so that the lip 17 does not obstruct the flow of the rinsing water during backwashing by means of the backwash nozzle 16. The gap is created, for example, when the first edge 12.1 of the screen 12 is swivelled beyond the lip 17 and the tension spring 14 pulls the fourth edge 12.4 of the screen 12 upwards. A cam track 18 can be provided in each of the inner surfaces 2.2, 2.3, which in each case guides a cam arranged on the fourth edge 12.4 of the screen 12, but not shown here, at least from above in such a way that the fourth edge 12.4 of the screen 12 is guided upwards towards the end of the swivelling movement towards the second position P2, pulled by the tension spring 14, in order to create the gap. The tension spring 14 also has the task of keeping the screen 12 pulled against the lip 17. The cam track 18 has the purpose of guiding the screen 12 at an angle suitable for backwashing. The cam track can, for example, be designed as a milled edge over which the screen 12 or a frame of the screen slides.

FIG. 13 is a schematic view of a wastewater system 30 with the wastewater diverter 1.

The wastewater diverter 1 can be installed in a wastewater system 30 of a building or another system in which wastewater can be produced both as black water and as grey water. This wastewater can be divided into grey water and black water by means of the wastewater diverter 1. For this purpose, a sensor system 31 may be provided upstream of the wastewater diverter 1, which is configured to detect whether the wastewater flowing through or expected next is grey water or black water. The sensor system 31 can, for example, comprise a switch or sensor that is connected to a flush button of a toilet flush and detects when the flush button is pressed and thus signals black water. In this case, a controller 32 connected to this sensor system 31 wirelessly or by wire and connected to the drive 9 of the waste water diverter 1 can control the drive 9 in such a way that the guide plate 7 is swivelled into the second position P2. A power supply for the sensor system 31 can, for example, be provided by a generator driven by a water wheel in the inlet pipe of a toilet flushing cistern. It may be provided that the guide plate 7 is in the first position P1 as standard and is only moved to the second position P2 when black water is signalled, optionally also with a certain time delay. It may be possible to switch back to grey water after a certain time has elapsed.

In one embodiment, a bypass 33 can be provided in the installation of the wastewater diverter 1, which directs wastewater from the wastewater inlet 4 to the blackwater outlet 6 in the event of backwater in the wastewater diverter 1.

The separation of the waste water into grey water and black water can, for example, be used to feed the grey water to a device 34 for heat recovery, in which drinking water and/or heating water of a hot water heating system, in particular a low-temperature heating system, is heated in a heat exchanger by waste heat from the grey water. Such a device is described, for example, in WO 2020/148230 A1, the content of which is incorporated in its entirety by reference in the present patent application.

LIST OF REFERENCE NUMBERS 1 waste water diverter
2 housing
2.2 inner surface
2.3 inner surface
2.4 inner surface
3 cavity
4 waste water inlet
5 grey water outlet
6 black water outlet
7 guide plate
7.1 first edge
7.2 second edge
7.3 third edge
7.4 fourth edge
8 rotating shaft
9 drive
10 step
11 projection
12 screen
12.1 first edge
12.2 second edge
12.3 third edge
12.4 fourth edge
13 swivelling axis
14 tension spring
15 pocket
16 backwash nozzle
17 lip
18 cam track
19 motor
20 gearbox
30 waste water system
31 sensor system 32 controller
33 bypass
34 heat recovery device
A1 first stop
A2 second stop
P1 first position
P2 second position

The invention claimed is:

1. A waste water diverter, comprising a housing which encloses a cavity, a waste water inlet arranged at an upper end of the housing and opening into the cavity, a grey water outlet and a black water outlet arranged at a lower end of the housing, which are connected to the cavity, wherein a guide plate is arranged in the cavity so as to be pivotable about an axis of rotation by means of a drive between a first position and a second position, in such a way that waste water flowing in through the waste water inlet is guided by the guide plate in the first position into the grey water outlet and the black water outlet is blocked and in the second position the grey water outlet is blocked by the guide plate and the waste water is guided into the black water outlet, wherein a screen is pivoted to an edge of the guide plate remote from the axis of rotation, which screen in the first position is located in the waste water flow between the waste water inlet and the grey water outlet and in the second position is not located in the waste water flow.

2. The waste water diverter according to claim 1, wherein an edge of the screen remote from the guide plate is attached to one end of at least one tension spring, an other end of the at least one tension spring is attached to or near a wall of the housing.

3. The waste water diverter according to claim 1, wherein the screen is displaced in the second position into a pocket of the cavity.

4. The waste water diverter according to claim 1, wherein a backwash nozzle is arranged in a wall of the housing, the backwash nozzle being directed towards an underside of the screen, which is inclined in the second position with a gradient in a direction of the black water outlet.

5. The waste water diverter according to claim 1, wherein the guide plate in the first position abuts against a first stop of an inner surface of the housing on a side of the black water outlet or is located at least in a vicinity of the first stop.

6. The waste water diverter according to claim 5, wherein this inner surface has a step such that the inner surface in a position of use projects above the first stop towards the cavity.

7. A waste water system, comprising at least one waste water diverter according to claim 1, wherein a sensor system is arranged upstream of the at least one waste water diverter, the sensor system is configured to signal if the waste water flowing through or expected next is black water, wherein a controller is arranged which is connected wirelessly or by wire to this sensor system and to the drive of the waste water diverter and which is configured to actuate the drive when black water is signalled in such a way that the guide plate is pivoted into the second position.

8. The waste water system according to claim 7, wherein the controller is configured to swivel the guide plate to the first position by default.

9. The waste water system according to claim 7, wherein a bypass is arranged which, in the event of backwater in the waste water diverter, directs waste water from the waste water inlet to the black water outlet.

10. The waste water system according to claim 7, wherein the grey water outlet is connected to a device for heat recovery, which is configured to heat drinking water and/or heating water of a hot water heating system in a heat exchanger by waste heat from the grey water.

11. The waste water system according to claim 7, wherein the sensor system is configured for detecting an actuation of a flush button of a toilet flush, wherein a generator is arranged for supplying voltage to the sensor system, which generator is driven by a water wheel in an inlet pipe of the toilet flush.

12. The waste water diverter according to claim 1, wherein further a flexible lip is arranged, which sweeps along an upper side of the screen towards the guide plate due to the movement of the screen during the swivelling from the first position to the second position.

13. The waste water diverter according to claim 12, wherein the lip is positioned such that a gap is formed between the flexible lip and the screen when the second position is reached.

14. The waste water diverter according to claim 13, wherein a guide for the edge of the screen remote from the guide plate is arranged in the housing in such a way that the edge of the screen remote from the guide plate is guided upwards towards the second position towards an end of the swivelling movement in order to create the gap.

* * * * *